United States Patent [19]

Erdogan et al.

[11] Patent Number: 5,694,248

[45] Date of Patent: Dec. 2, 1997

[54] SPATIALLY-VARYING DISTRIBUTED BRAGG REFLECTORS IN OPTICAL MEDIA

[75] Inventors: Turan Erdogan, Berkeley Heights; Victor Mizrahi, Bedminster, both of N.J.

[73] Assignee: Lucent Technologies Inc., Murray Hill, N.J.

[21] Appl. No.: 542,241

[22] Filed: Oct. 12, 1995

Related U.S. Application Data

[63] Continuation of Ser. No. 198,915, Feb. 18, 1974, abandoned, which is a continuation-in-part of Ser. No. 995,492, Dec. 23, 1992, Pat. No. 5,363,239.

[51] Int. Cl.$^6$ ................................................. G02B 5/18
[52] U.S. Cl. .................... 359/570; 359/572; 359/575; 385/37
[58] Field of Search ........................ 359/3, 8, 35, 570, 359/569, 572, 575; 372/6, 102; 385/37

[56] References Cited

U.S. PATENT DOCUMENTS

| | | | |
|---|---|---|---|
| 4,093,338 | 6/1978 | Bjorklund et al. | 359/35 |
| 4,807,950 | 2/1989 | Glenn et al. | 385/123 |
| 5,007,705 | 4/1991 | Morey et al. | 385/12 |
| 5,042,897 | 8/1991 | Meltz et al. | 385/37 |
| 5,066,133 | 11/1991 | Brienza | 359/570 |
| 5,195,161 | 3/1993 | Adar et al. | 385/37 |
| 5,208,882 | 5/1993 | Strasser et al. | 385/37 |
| 5,218,651 | 6/1993 | Faco et al. | 385/37 |
| 5,218,655 | 6/1993 | Mizrahi | 385/37 |
| 5,235,659 | 8/1993 | Atkins et al. | 385/124 |
| 5,237,576 | 8/1993 | Digiovanni et al. | 385/37 |
| 5,257,273 | 10/1993 | Farries et al. | 372/6 |
| 5,305,336 | 4/1994 | Adar et al. | 385/37 |
| 5,309,260 | 5/1994 | Mizrahi et al. | 359/569 |
| 5,323,404 | 6/1994 | Grubb | 372/102 |
| 5,337,382 | 8/1994 | Mizrahi | 385/37 |
| 5,363,239 | 11/1994 | Mizrahi et al. | 359/570 |
| 5,400,422 | 3/1995 | Askins et al. | 385/37 |
| 5,420,948 | 5/1995 | Byron | 385/37 |

FOREIGN PATENT DOCUMENTS 0572169  12/1993  European Pat. Off. .......... G02B 6/16

OTHER PUBLICATIONS

I. Bennion, et al., "High-Reflectivity Monomode-Fibre Grating Filters", Electronics Letters, vol. 22, No. 6, pp. 341-346, (1986).

J.L. Archambault, et al., "100% Reflectivity Bragg Reflectors Produced in Optical Fibers By Single Excimer Laster Pulses", Electronics Letters, vol. 29, No. 5, pp. 453-455, (1993).

Y. Mizrahi, et al., "Ultraviolet Fabrication of Ultra-Strong Fiber Gratings and of Germania-Doped Channel Waveguides", Appl. Phys. Lett. vol. 63, No. 13 pp. 1727-1729 (1993).

M.C. Farries, et al., "Broadband Chirped Fibre Bragg Filters For Pump Rejection and Recycling in Erbium Doped Fibre Amplifiers," Electronics Letters, vol. 28, No. 5, pp. 487-489, (1992).

P.J. Lemaire, et al, "High Pressure $H_2$ Loading As A Technique For Achieving Ultrahigh UV Photo Sensitivity And Thermal Sensitivity In $GeO_2$ Doped Optical Fibers" Electronics Letters, vol. 29, No. 13, pp. 1191-1193, (1993).

Primary Examiner—Paul M. Dzierzynski
Assistant Examiner—John Juba, Jr.
Attorney, Agent, or Firm—Glen E. Books

[57] ABSTRACT

An improved Bragg grating for an optical waveguide comprising a core and a cladding. The grating includes refractive index perturbations formed within the waveguide. It has a bandwidth in reflection having a full width at half-maximum greater than 12 nm, a total intrinsic optical loss less than 0.2 dB, and a total peak optical extinction, measured in transmission, greater than 20 dB.

9 Claims, 5 Drawing Sheets

SPATIALLY-VARYING DISTRIBUTED BRAGG REFLECTORS IN OPTICAL MEDIA

CROSS-REFERENCE TO RELATED APPLICATION

This application is a continuation of application Ser. No. 08/19815 filed Feb. 18, 1994, now abandoned, which is a continuation-in-part application of commonly assigned U.S. patent application Ser. No. 07/995,492 filed on Dec. 23, 1992, and now U.S. Pat. No. 5,363,239.

FIELD OF THE INVENTION

This invention pertains to passive optical components known as induced gratings that are integrated with waveguiding articles such as optical fibers. Gratings described herein are particularly useful as pump radiation reflectors in optical fiber systems using doped fiber amplifiers.

ART BACKGROUND

Along with photoresists and the like, certain optical media, including at least some silica-based optical fibers, can be modified by exposure to electromagnetic radiation in an appropriate spectral range. (Such radiation, typically ultraviolet radiation, is referred to below as "actinic" radiation.) That is, exposure of a photosensitive optical fiber (or other optical medium) to actinic radiation may cause the refractive index to change in the exposed portion of the medium. A periodic pattern can be imposed on the impinging radiation by, e.g., superimposing a pair of beams of substantially monochromatic radiation from, e.g., a laser, to create an interference pattern. If two beams of wavelength $\lambda$ intersect at an intersection angle $\phi$, the resulting interference pattern will have a period $\Lambda$ given by $\Lambda = 0.5\lambda \csc \phi/2$. When such a patterned radiation field impinges on an optical fiber or other optical waveguide having a core of the appropriate photosensitivity, a corresponding pattern is imposed on the core in the form of periodic (or quasiperiodic) fluctuations in the core refractive index. Such a pattern, which is often referred to as a "Bragg grating" or a "distributed Bragg reflector (DBR)" can behave as a spectrally selective reflector for electromagnetic radiation. Bragg gratings formed in this manner are particularly useful as end-reflectors in optical fiber lasers. These Bragg gratings are useful both because they are spectrally selective, and because they are readily incorporated in the same optical fiber that supports the active laser medium.

A technique for creating these Bragg gratings is described in U.S. Pat. No. 4,725,110, issued to W. H. Glenn, et al. on Feb. 16, 1988, and U.S. Pat. No. 4,807,950, issued to W. H. Glenn, et al. on Feb. 28, 1989. An optical fiber laser having a DBR-terminated cavity is described in G. A. Ball and W. W. Morey, "Continuously tunable single-mode erbium fiber laser", *Optics Lett.* 17 (1992) 420–422.

Bragg gratings are useful as passive optical components for other applications besides end-reflectors in fiber lasers. For example, Bragg gratings are useful as spectral filters for wavelength-division multiplexing and other optical signal-processing applications. An optical filter which comprises a Bragg grating formed in an optical fiber is described in U.S. Pat. No. 5,007,705, issued to W. W. Morey, et al. on Apr. 16, 1991. Similar techniques are useful for forming a grating pattern in a photosensitive medium such as a photoresist overlying a substrate. The substrate is lithographically processed after exposure and development of the resist An application of particular use in telecommunications is the use of broadband in-line gratings to form pump radiation reflectors in an optical fiber communication system with doped fiber amplifiers. See U.S. Pat. No. 5,218,655 issued to Victor Mizrahi on Jun. 8, 1993, which is incorporated herein by reference. As shown in the '655 patent, gratings disposed between the amplifier and the detector in such a system can be used to reflect pump radiation away from the detector and back through the amplifier, enhancing pumping efficiency.

For some applications, it is desirable to provide a Bragg grating that is quasiperiodic instead of periodic. That is, the period of the grating (i.e., the linear distance, along the propagation axis, between successive peaks or valleys of the refractive index profile) is not a constant, but instead changes in a predetermined fashion along the propagation axis. The most common quasiperiodic grating is one in which the period increases or decreases as a function, typically an approximately linear function, of position along the propagation axis. Such a grating is referred to as a "chirped" grating. Chirped gratings are useful, inter alia, for making broadband optical reflectors. An application of chirped gratings in optical fiber communication lasers is described in co-pending U.S. patent application Ser. No. 07/827,249, filed by R. Adar et al. on Jan. 29, 1992. An application of chirping to remove undesirable structure from grating reflectivity spectra is described in the co-pending U.S. patent application entitled "Method for Forming Distributed Bragg Reflectors in Optical Media", filed by V. Mizrahi et al. and incorporated herein by reference.

In the conventional method for making chirped gratings photoresists), the interfering beams that impinge upon the photosensitive medium are not collimated. Instead, each is made to diverge at a predetermined divergence angle. As a consequence of the divergence of the beams, there lacks a single, well-defined angle of intersection between the beams. Instead, there is an effective angle of intersection that depends upon position (measured along the propagation axis of the photosensitive medium) within the interference pattern. As a result, a grating is formed that has a spatially dependent period. This method is described in X. Mai, et al., "Simple versatile method for fabricating guided-wave gratings", *Appl. Optics*, 24 (1985) 3155–3161.

This conventional method is disadvantageous because it cannot be used to make a grating in which the period has an arbitrary spatial dependence. Instead, this dependence can only take a form that is accessible by the method of diverging the beams.

SUMMARY OF THE INVENTION

We have discovered a new method for making gratings, such as Bragg gratings, having spatially dependent periods. In contrast to prior art methods, the period can be independently specified in different portions of the grating. As a result, a broad range of functional forms can be specified for the spatial dependence and new gratings having highly advantageous futures can be made.

In one embodiment, the invention involves a grating formed along an axis, to be referred to as an "optical propagation axis", by exposing a photosensitive medium. The direction of this axis is referred to herein as the "axial" direction. The method includes the step of producing two collimated, non-collinear beams of electromagnetic radiation having an actinic wavelength $\lambda$, i.e., a wavelength capable of inducing refractive index changes in the medium. The two beams are impinged on at least a portion of the medium at an intersection angle $\phi$, such that a periodic interference pattern is created on the impinged portion. The method further includes the step of advancing the illuminated portion of the interference pattern relative to the medium such that at least local coherence of the interference pattern is preserved. The method further includes, during the advancing step, the step of changing the product $\lambda \times 0.5 \csc\phi/2$, such that the interference pattern has a spatially varying period.

In a second embodiment of the invention, a Bragg grating is formed by producing interfering, actinic beams, impinging them on a photosensitive optical medium, and advancing the illuminated portion of the interference pattern relative to the medium, as recited above, resulting in formation of a refractive index perturbation in the medium. This embodiment, further includes, during the advancing step, varying the dose of actinic radiation received by the various points of the resulting refractive index perturbation. As a result of this variation, the average amplitude of the perturbation is made to vary, in the axial direction, according to a predetermined pattern. The "average" amplitude in this sense is the spatially-dependent amplitude averaged over many, e.g. 10, grating periods.

DETAILED DESCRIPTION OF A PREFERRED EMBODIMENT

For simplicity, the following discussion will be directed to forming a Bragg grating in an optical fiber. It should be noted, however, that gratings can be formed in other optical media either by direct exposure or by exposure of a photoresist followed by conventional lithographic processing. We intend to include these alternative inertia within the scope of the invention, and to include, in addition to Bragg gratings, other types of gratings such as reflection gratings.

We have found it advantageous to create the interference pattern using a scanning interferometer of a design in which the translation of a single, translatable mirror can advance the position of the illuminated portion of the interference pattern along the fiber, or other photosensitive medium; while preserving its registration, i.e., without changing the phase of the interference pattern. The fiber or other media is kept stationary and the mirror is translated during exposure of, e.g., the fiber. As a consequence, a refractive index perturbation is readily created in, e.g., the fiber having a greater axial extent than the illuminated portion itself.

Figure 1:
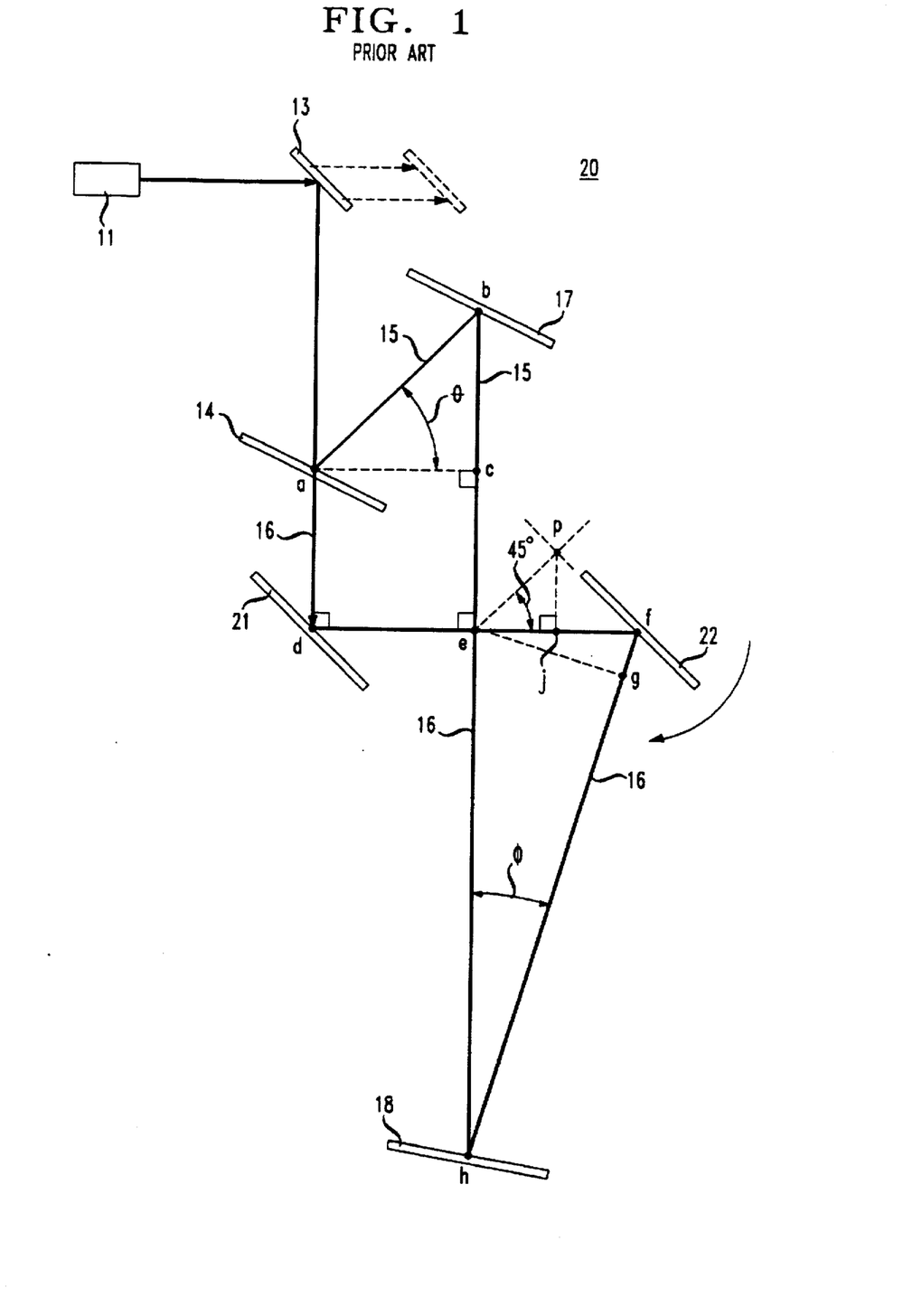
FIG. 1 is a schematic, optical diagram of an interferometer useful for practicing the invention, in one embodiment.

A currently preferred interferometer 20 for carrying out such exposures is depicted in FIG. 1, and is described in detail in U.S. Pat. No. 4,093,338, issued to G. C. Bjorklund, et al. on Jun. 6, 1978. The optical arrangement of this interferometer includes laser source 11, translatable mirror 13, rotatable mirror 22, and mirrors 14, 17, and 21. The interfering beams converge on photosensitive medium 18, which is exemplarily an optical fiber. The illuminated portion of the interference pattern is shifted (without affecting its phase) along the fiber by translating mirror 13. The period of the interference pattern is determined by the actinic wavelength, and by the rotational position of rotatable mirror 22.

According to a preferred method for making the Bragg gratings, the fiber is first clamped into position to assure that the regions to be exposed are straight. The fiber is subjected to an effective exposure of radiation, typically ultraviolet light. Various appropriate sources of ultraviolet light are available and known to those skilled in the art.

By way of illustration, we have found that an excimer-pumped, frequency doubled, tunable dye laser emitting at about 245 nm is an appropriate exposure source. The use of such an exposure source is described in co-pending U.S. patent application Ser. No. 07/878791, filed on May 5, 1992 by D. J. DiGiovanni, et al., which we hereby incorporate by reference. As discussed therein, this exposure source is useful for making gratings in highly erbium-doped, silica-based optical fibers. These fibers are typically exposed to 2-mJ pulses at a repetition rate of 20 pulses per second. A cylindrical lens focuses the laser light into a band about 0.5 cm long and 100–200 µm wide. Typical exposures are about 30 seconds in duration. By that method, Bragg gratings are readily formed with, e.g., a constant period of about 0.5 µm.

As noted, the period $\Lambda$ of the interference pattern formed by the intersecting, actinic beams is expressed by the products $\lambda \times 0.5 \csc\phi/2$. In order to create a quasiperiodic grating having a desired spatial dependence, this product is varied while displacing the illuminated portion of the interference pattern by translating mirror 13. The product can be varied either by changing the wavelength $\lambda$, or by changing the intersection angle $\phi$. The wavelength is readily varied if the source of the actinic radiation is a tunable laser. By way of illustration, excimer-pumped, frequency doubled, dye lasers are readily available that emit light over a practical range extending from about 235 nm to about 245 nm. At constant intersection angle, such an exposure source allows the grating period to be varied by as much as about 4% over the length of the grating.

As noted, the preferred interferometer can be used to displace the illuminated portion of the interference pattern without changing its phase; i.e., to displace it in such a way that its coherence is preserved. However, if the wavelength is changed during the displacement, the interference pattern will be coherent only over a short distance. Typical grating designs will call for a wavelength variation of only a fraction of one percent. Thus, the interference pattern, even with wavelength variation, will typically be coherent (to a good approximation) over many tens of grating periods. Such an interference pattern is referred to herein as "locally coherent."

One limitation on the chirping of gratings is imposed by the spot size of the interfering, actinic beams. If the Bragg wavelength changes too steeply over this distance, displacement of the spot will cause newly written portions of the grating to add incoherently to portions written just previously, leading to at least partial ensure of the grating.

As a rough guideline, this can be avoided if the variation $\delta\lambda_B$ of the Bragg wavelength $\lambda_B$ over one spot size $L_{spot}$ satisfies the relation $$\frac{\delta\lambda_B}{\lambda_B} L_{spot} < 1/4 \Lambda,$$

wherein $\Lambda$ is the nominal grating period.

It is generally undesirable to vary the intersection angle, during actinic exposure, by rotating mirror 22. Mechanical coupling between the mirror bearings and the optical system can cause vibrations that unacceptably degrade the stability of the interference pattern. Moreover, the rotation that produces the required wavelength shift will often be too small to control in a practical way. However, there is a practical alternative to rotating mirror 22. That is, the intersection angle is readily varied by substituting a curved mirror for one of the planar mirrors of the optical system, as explained in more detail below.

Illustratively, an electromechanical actuator (the "translation actuator") is used to translate mirror 13, and a second electromechanical actuator (the "period-setting actuator") is used to change the tuning of the light source. A programmable controller, such as a microprocessor-based controller, is used to control both the translation actuator and the period-setting actuator. The controller is programmed to provide the desired functional relationship between the period in each portion of the grating and the axial position of that portion.

Figures 2, 3:
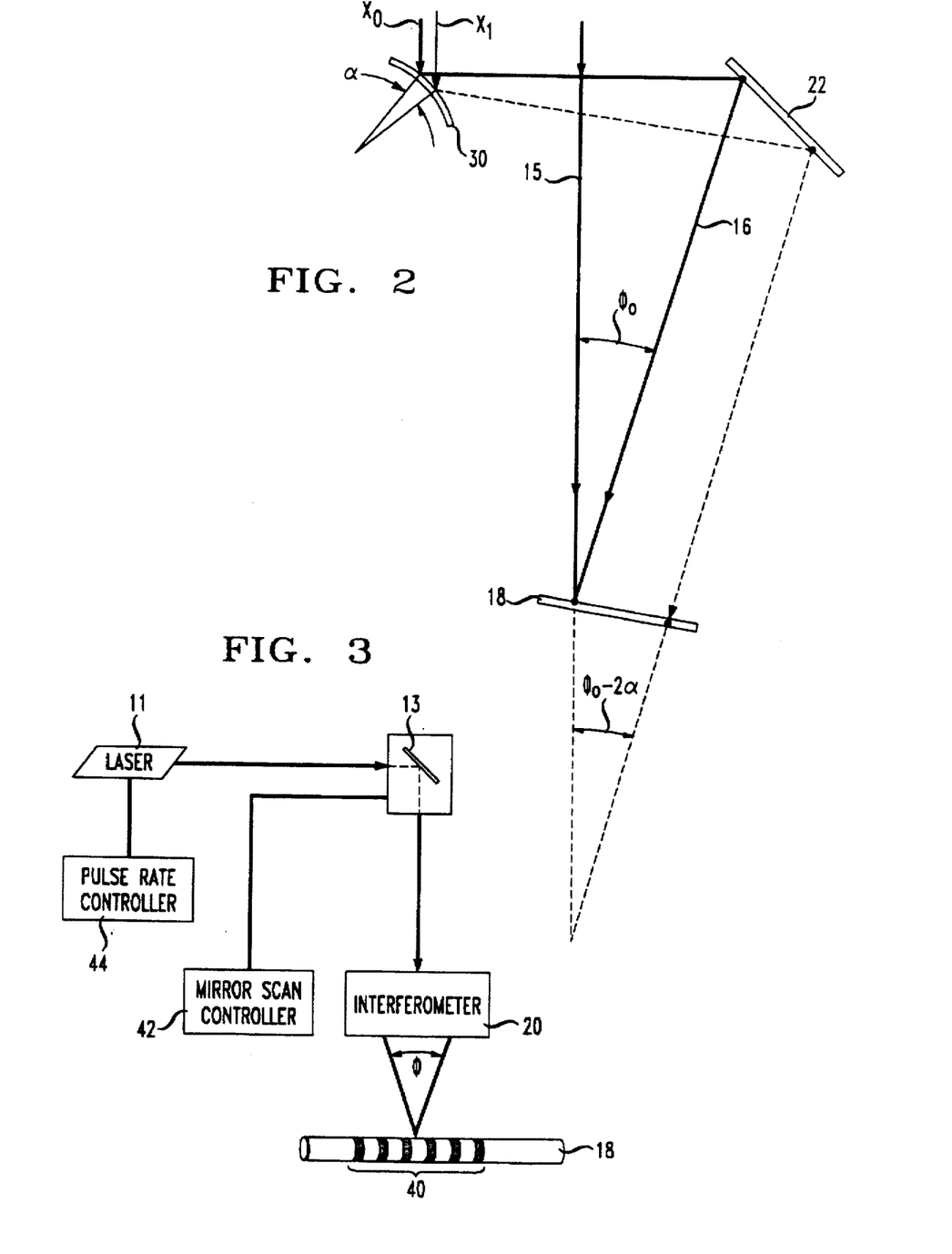
FIG. 2 is a portion of the optical diagram of FIG. 1. According to the invention in one embodiment, a curved mirror has been substituted for one of the planar mirrors of FIG. 1.
FIG. 3 is a block diagram of an illustrative system for practicing the invention, according to one embodiment. The system includes apparatus for controlling the dose of actinic radiation to the photosensitive medium.

If the intersection angle is varied by including a curved mirror in the optical system, a chirped grating can be made in a simple way. The spatial dependence of the grating period is determined by the shape of the reflective surface of one of the mirrors in the optical system. As shown in FIG. 2, curved mirror 30 can be substituted for, e.g., mirror 21 of the optical system. (The selection of mirror 21 for substitution is not unique. The curved mirror can be substituted for any of the planar mirrors in the optical system except for mirror 13.) If, for example, mirror 30 has a spherical convex or concave surface, the resulting interference pattern will have a chirp that is approximately linear.

With reference to FIG. 2, it is apparent that a translation of mirror 13 from $x_0$ to $x_1$ will turn beam 16 through an angle of $2\alpha$. The resulting change in the intersection angle between beams 15 and 16 will cause the local grating period to change as well. Thus, a chirped grating is formed simply by translating mirror 13 while exposing the photosensitive medium with a constant actinic wavelength. By way of illustration, a chirped grating can be made using a convex, spherical mirror having a radius of curvature of about 50 m. Assuming a grating having a nominal Bragg wavelength of 1.5 μm, we predict that a 1-cm displacement of mirror 13 will lead to a total shift of the Bragg wavelength of about 19 Å, or about 0.12%.

It should be noted that if the interfering beams are wide enough relative to the radius of curvature of mirror 30, a chirped grating can be made even without a translation of mirror 13. This is done by reflecting at least one of the beams from mirror 30. (The other beam is optionally reflected from a second curved mirror.)

The inventive method invites a further type of modification of the Bragg grating. That is, with reference to FIG. 3, the strength of grating 40 (i.e., the amplitude of the refractive index perturbation) is related to the duration and intensity of the actinic exposure. This strength can be modulated as a function of axial position by modulating the dose of actinic radiation. This dose is readily modulated by controlling (e.g., by controller 42) the translational velocity of mirror 13, by controlling the emissive intensity of light source 11, or (if source 11 is a pulsed light source) by controlling the pulse repetition rate of the light source. Of these three options, the last is currently preferred. That is, the repetition rate of, e.g., a pulsed, excimer-pumped, dye laser is readily controlled by programmable, microprocessor-based controller 44, to produce a Bragg grating having a specified average refractive index profile. (By "average" profile is meant the spatially dependent refractive index averaged over many, exemplarily ten, grating periods.) Modification of the average refractive index profile is useful, inter aria, for improving the spectral characteristics of Bragg gratings. One such application is described, for example, in the previously cited, co-pending U.S. patent application filed by V. Mizrahi et al. under the title "Method for Forming Distributed Bragg Reflectors in Optical Media."

We have found that by using a curved mirror in this fashion, Bragg gratings are readily made with chirp rates greater than 3 Å/cm, and chirp rates greater than 10 Å/cm or even 100 Å/cm are readily provided. At a central Bragg wavelength of 1.55 μm, these rates are, respectively, 0.02%, 0.05%, and 0.5% per centimeter. Moreover, the chirp of these gratings is linear to better than 10%. That is, the length of a typical Bragg grating can be expressed with reference to the spatially averaged refractive index perturbation $\delta(x)$, where x is measured in the direction of optical propagation. The full width at half-maximum of the distribution $\delta(x)$ is generally a convenient measure of the grating length. Over this length, the period $\Lambda$ of the (chirped) grating can be approximated by the best linear fit $\Lambda_o$, given by $\Lambda_o = \lambda_o + mx$, where $\lambda_o$ and m are constants. It should be noted, in this regard, that $\Lambda(x)$ refers to the separation between successive lines of the grating as written. This is not the same as the optical path length between successive lines, since the optical path length will be affected by variations of the refractive index. Thus, even when the geometrical period $\Lambda$ is purely linear in x, the period as it affects propagating radiation will generally have a higher-order, e.g., quadratic component. By "linear to better than 10%" is meant that over the length of the grating, the absolute difference between $\Lambda$ and $\Lambda_o$ is everywhere less than $\Lambda_o$ times 10%.

By way of example, we have used exposure methods essentially as described above to produce high-chirp-rate gratings in hydrogen-sensitized optical fibers. The use of hydrogen to enhance the photosensitivity of optical fibers is described, for example, in U.S. Pat. No. 5,235,659, issued to R. M. Atkins et al., on Aug. 10, 1993, which is incorporated herein by reference.

Figure 4:
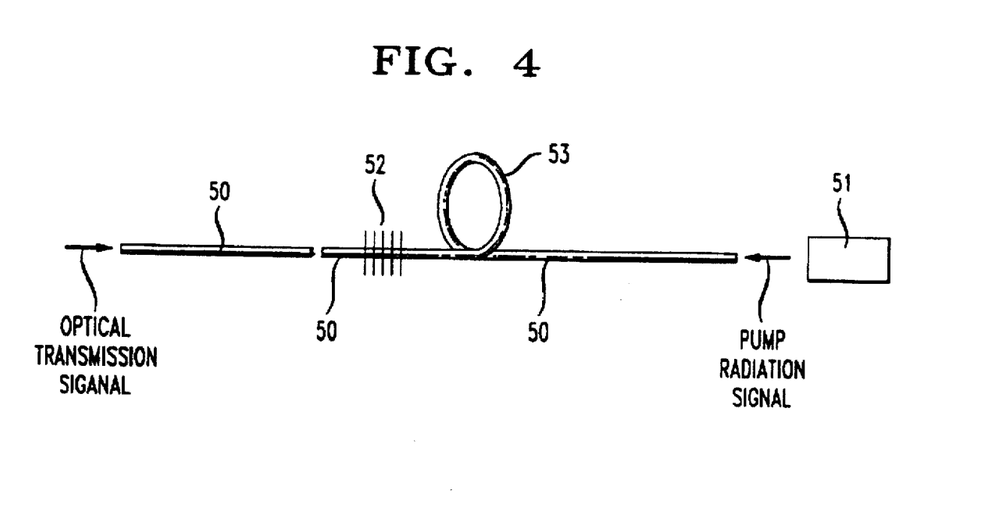
FIG. 4 is a schematic diagram showing a preferred method of using gratings in a remotely pumped optical fiber transmission system.

Applicants have further discovered that improved performance gratings in accordance with the invention are particularly useful as pump radiation reflectors in optical fiber communication systems with doped fiber amplifiers. FIG. 4 schematically illustrates such a system comprising a length of optical transmission fiber 50 for carrying an optical transmission signal, a doped fiber amplifier 53, such as Er-doped fiber, for amplifying the signal, a source of pump radiation 51 for providing pump radiation to the amplifier and a grating 52 disposed for reflecting pump radiation into the amplifier. Preferably the pump radiation is transmitted through transmission fiber 50 and the amplifier 53 is disposed in the path between the pumping source 51 and the grating 52 so that the amplifier is pumped by both the transmitted pump radiation and by the pump radiation reflected by the grating In current practice, the optical transmission signal is 1.55 micrometer radiation and the pump radiation is centered at about 1.48 micrometers. In contemplated applications, the amplifying fiber is a kilometer or more from the pump radiation source. In other applications there can be multiple stages of pumps, amplifiers and gratings.

In order to optimize the performance of such systems, the grating 52 should have a combination of characteristics not found in conventional gratings. For example, the grating should be sufficiently broadband to encompass the spectral spread of the pumping source. With conventional sources, this means the grating should have a reflection characteristic having, at half-maximum, a full-width greater than 12 nm and, more advantageously, greater than 20 nm. Moreover, system considerations require for optimal performance, that the grating should have a total intrinsic optical loss that is less than 0.5 dB (and preferably less than 0.2 dB), and a peak optical extinction, measured in transmission, greater 20 dB (for 12 nm gratings) or greater than 10 dB (for 20 nm gratings). Applicants believe that they have for the first time, demonstrated gratings which meet these conditions.

The fabrication and structure of such gratings can be understood in greater detail by consideration of the following specific examples which, except as noted, were fabricated using the method and apparatus described above.

EXAMPLE 1

A broadband, low-loss fiber grating was first fabricated in a fiber with properties similar to fibers used for Erbium amplifiers, except the fiber contained no Erbium. The fiber core contained 16 mole % Germanium, had a $\Delta$ of 1.9%, had a radius of 1.2 μm, and was co-doped with Aluminum. The fiber was loaded with 3 mole % of Deuterium to increase its ultraviolet photosensitivity by holding it at 50° C. for 4 days in 370 atm of $D_2$. The ultraviolet laser source consisted of an excimer-laser-pumped, frequency-doubled dye laser that produced 15 nsec pulses at 30 Hz repetition rate. The resulting 242 nm laser beam was nearly gaussian in profile, had an average power of 30 mW, and was focused using a cylindrical lens placed between mirror 13 and beam splitter 14 to a spot size of 8 mm×50 μm at the fiber. The quasi-periodic pattern had a chirp rate of 19 nm/cm, resulting from the use of a curved mirror with a 5 m radius of curvature. The fiber was exposed for 6 minutes.

An important modification was made to the interferometer apparatus shown in FIG. 2 in order to enable a high-quality chirped grating to be made using this highly curved mirror. With a flat mirror in place of the curved mirror and the cylindrical focusing lens placed one focal length from the fiber, the beams traversing both arms of the interferometer were focused to the same spot size, and hence intensity, at the fiber. When the curved mirror was replaced, the beam traversing the curved mirror path was substantially defocused at the fiber, giving rise to a variation in the fringe visibility of the interference pattern along the fiber. In order to avoid this problem, the cylindrical lens position was adjusted to provide equal intensities of the two beams at the center of the interference pattern.

Figure 5:
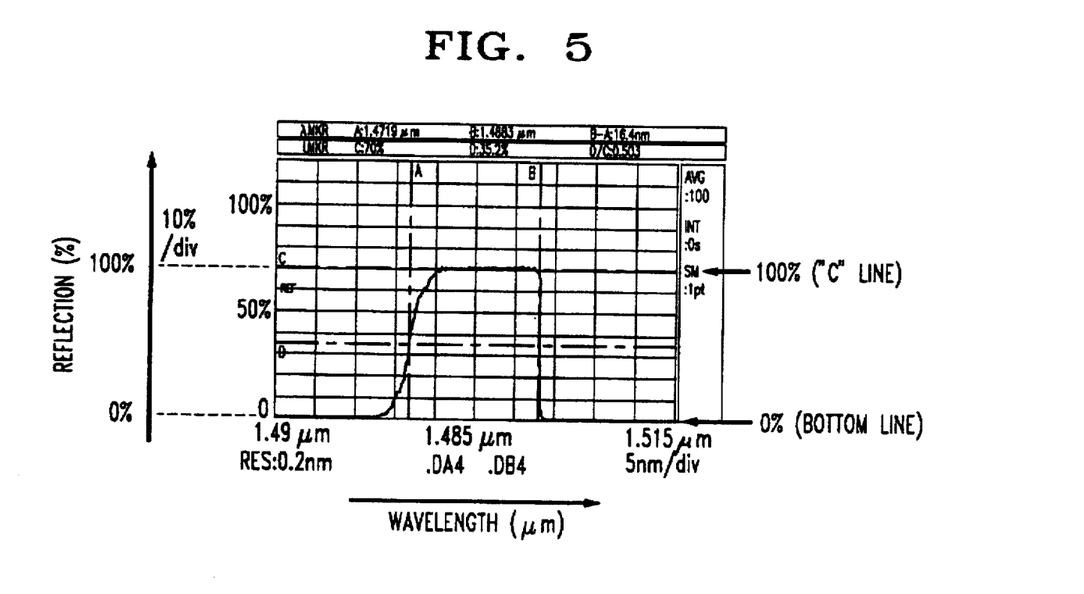
FIGS. 5 and 6 are the reflection and transmission characteristics of a first exemplary grating particularly useful in the system of FIG. 4.
Figure 6:
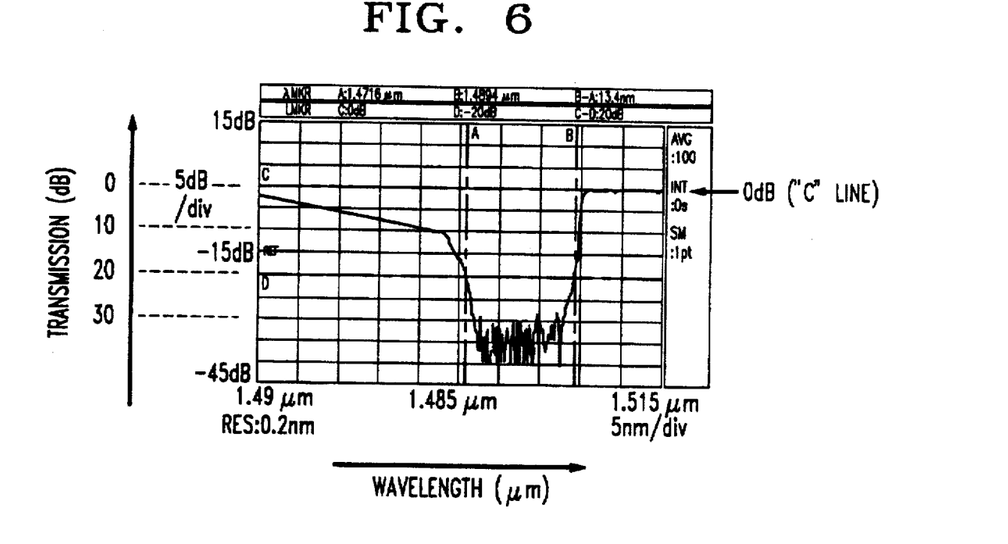

The spectrum of the resulting grating was measured both in reflection and transmission using a broadband, light-emitting diode and an optical spectrum analyzer. The spectra are shown in FIGS. 5 and 6, respectively. For the reflection spectrum, light was incident on the short-period end of the chirped grating. This directionality is important to avoid scattering loss out of the fiber. This grating has a reflection bandwidth of 16.4 nm full-width at half maximum (FWHM). From the transmission spectrum, it is clear that the optical extinction well exceeds 20 dB, and the insertion loss on the long wavelength side of the Bragg region is less than 0.1 dB.

EXAMPLE 2

Figure 7:
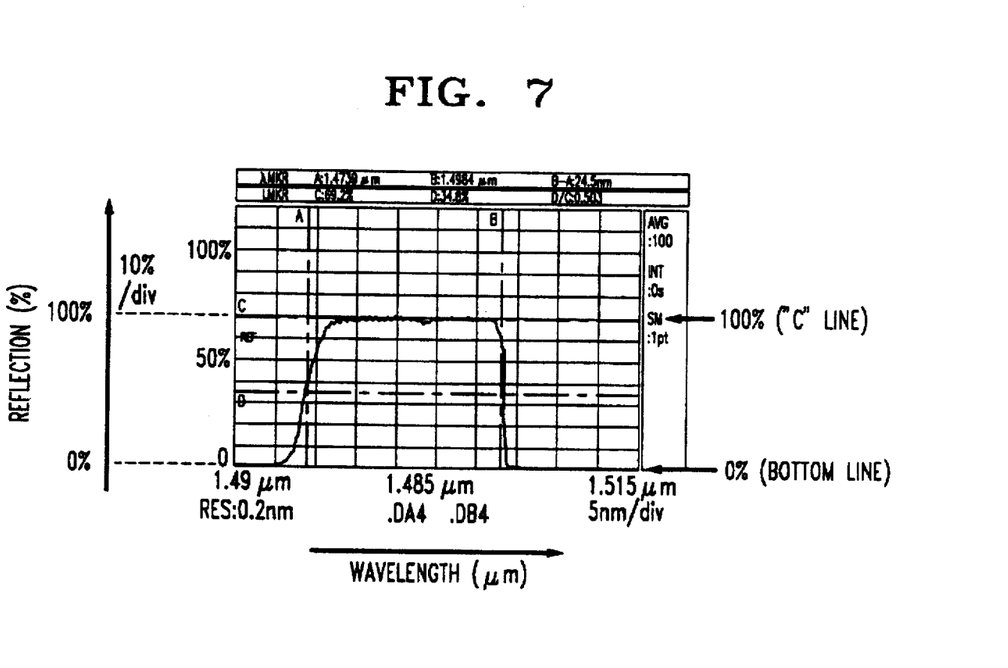
FIGS. 7 and 8 are the characteristics of a second exemplary grating.
Figure 8:
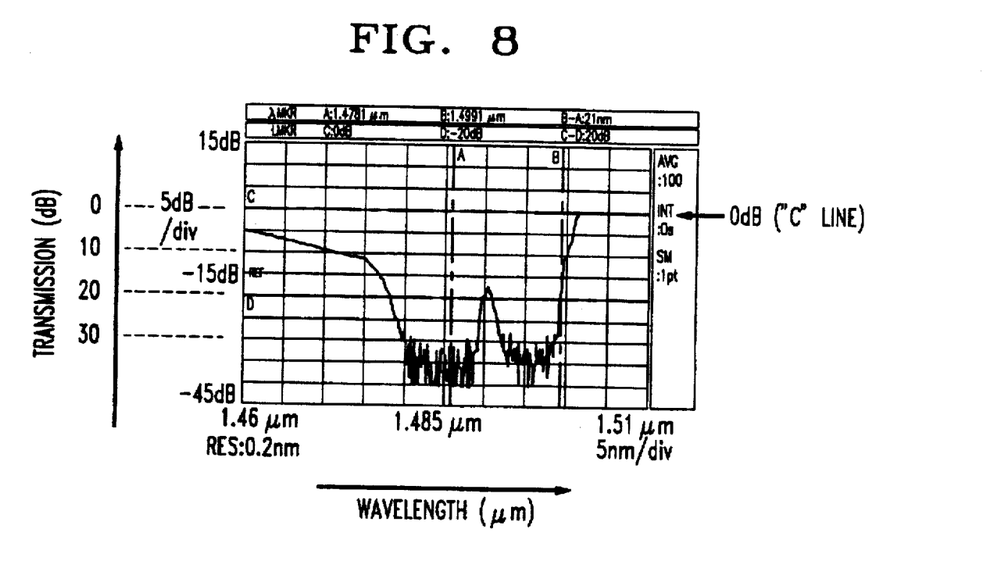

A second grating was written in the same fiber and using the same laser source and interferometer as described in Example 1, but for this grating the bandwidth was increased by laterally scanning the laser beam incident on the interferometer by translating mirror 13 from FIG. 2. After exposing the fiber for 4 minutes, the beam was scanned 6 mm along the fiber, and the exposure was continued for another 4 minutes. The FWHM reflection bandwidth for this grating, as shown in FIG. 2, is 24.5 nm. However, there is a region near the center of the spectrum where the reflectivity is diminished. This region shows up more clearly in the transmission spectrum of FIG. 8 as a region of less than 20 dB extinction. It occurred in this grating because of imperfect alignment of the two beams transverse to the fiber axis as the beams were scanned, and imperfect adjustment of the cylindrical lens position. Because the second exposure overlaps the first, as is necessary to obtain one continuous broad spectrum, imperfect alignment can cause grating erasure, giving rise to the "notch" in the spectrum. This grating also has an insertion loss of less than 0.1 dB.

EXAMPLE 3

Figure 9:
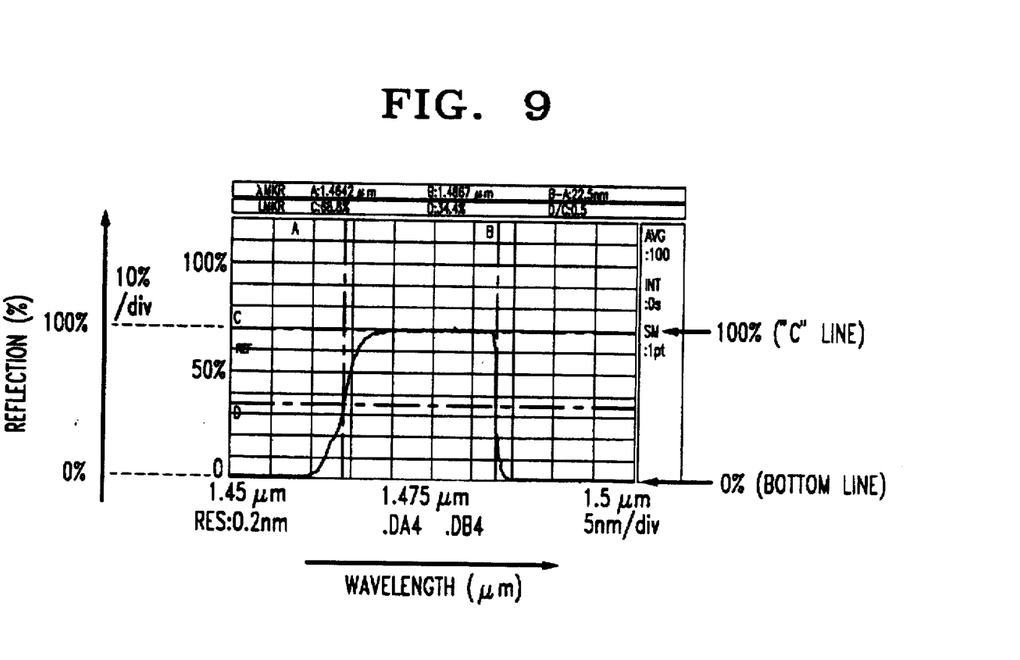
FIG. 9 is the reflection characteristic of a third exemplary grating.

A third grating was written in the same fiber and using the same laser source and interferometer as described in Example 1, and the same laterally scanning technique described in Example 2, but for this grating the alignment was improved to avoid the "notch" that occurred in Example 2. The fiber was exposed for 4 minutes, the beam was scanned 6 mm along the fiber, and then the exposure continued for another 3 minutes. A reflection spectrum of this grating is shown in FIG. 9. The grating has a FWHM reflection bandwidth of 22.5 nm, as measured by light incident on the short-period side of the grating. Although not shown, the extinction well exceeds 20 dB, and the insertion loss is less than 0.1 dB.

It is to be understood that the above-described embodiments are illustrative of only a few of the many possible specific embodiments of the invention. For example it is believed that with recent advances the improved gratings can now be made using phase mask exposure of photosensitive fiber. Numerous and varied other arrangements can be made by those skilled in the art without departing from the spirit and scope of the invention.

We claim:

1. In an optical waveguide for propagating light comprising a core and a cladding, a Bragg grating comprising refractive index perturbations formed within the waveguide, said grating having a bandwidth in reflection having a full width at half-maximum greater than 12 nm;
   a total intrinsic optical loss less than 0.2 dB; and
   a total peak optical extinction, measured in transmission, greater than 20 dB.

2. A device according to claim 1 wherein said index perturbations are formed at least partially in the core of said waveguide.

3. A device according to claim 1 wherein said optical waveguide is an optical fiber.

4. In an optical waveguide for propagating light comprising a core and a cladding, a Bragg grating comprising refractive index perturbations formed within the waveguide, said grating having a bandwidth in reflection having a full width at half-maximum greater than 20 nm and;
   a total intrinsic loss less than 0.5 dB; and a total peak optical extinction, measured in transmission, greater than 20 dB.

5. In an optical fiber waveguide for propagating light comprising a core and a cladding, a Bragg grating comprising refractive index perturbations formed at least partially within said core, said grating having a bandwidth in reflection having a full width at half-maximum greater than 20 nm; a total intrinsic optical loss less than 0.2 dB; and a total peak optical extinction, measured in transmission, greater than 10 dB.

6. A device according to claim 5 wherein said peak optical extinction is greater than 20 dB.

7. In an optical transmission system comprising a length of optical transmission waveguide for transmitting an optical signal, amplifying means requiring pump radiation for amplifying said optical signal, pump radiation source means for supplying pump radiation for said amplifier, and a Bragg grating for reflecting pump radiation to said amplifier, the improvement where:

said grating comprises a waveguide grating having a bandwidth in reflection having a full width at half-maximum measured in reflection that is greater than 12 nm; a total intrinsic optical loss that is less than 0.2 dB and a peak optical extinction, measured in transmission, greater than 20 dB.

8. The improved system of claim 7 wherein said grating has a full-width at half-maximum greater than 20 nm.

9. The improved system of claim 7 wherein said amplifying means is more than one kilometer from said pump source means.

* * * * *